US011861971B2

(12) United States Patent
Danielson et al.

(10) Patent No.: US 11,861,971 B2
(45) **Date of Patent: *Jan. 2, 2024**

(54) ROULETTE WHEEL DISPLAY DEVICE AND RELATED DEVICES, SYSTEMS, AND METHODS

(71) Applicant: IGT, Las Vegas, NV (US)

(72) Inventors: Patrick Danielson, Las Vegas, NV (US); Samantha Ascheri-Phillips, Reno, NV (US); Dwayne Nelson, Las Vegas, NV (US); Vincent Lai, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,527

(22) Filed: Apr. 25, 2022

(65) Prior Publication Data

US 2022/0245992 A1 Aug. 4, 2022

Related U.S. Application Data

(63) Continuation of application No. 16/800,642, filed on Feb. 25, 2020, now Pat. No. 11,315,382.

(51) Int. Cl.
*G07F 17/32* (2006.01)

(52) U.S. Cl.
CPC ........ *G07F 17/3211* (2013.01); *G07F 17/329* (2013.01)

(58) Field of Classification Search
USPC .......................................................... 463/17
See application file for complete search history.

(56) References Cited

U.S. PATENT DOCUMENTS

| | | | | |
|---|---|---|---|---|
| 8,152,171 | B2 * | 4/2012 | Miltenberger | G07F 17/3213 273/142 E |
| 2016/0328905 | A1 * | 11/2016 | Kohl | G07F 17/3262 |
| 2017/0165562 | A1 * | 6/2017 | Fitoussi | A63F 5/0047 |
| 2019/0046866 | A1 * | 2/2019 | Fitoussi | G07F 17/329 |
| 2020/0372762 | A1 * | 11/2020 | Baskerville | G07F 17/3288 |
| 2021/0110642 | A1 * | 4/2021 | Ocampo | G07F 17/3211 |

* cited by examiner

*Primary Examiner* — Pierre E Elisca
(74) *Attorney, Agent, or Firm* — Sage Patent Group

(57) ABSTRACT

A roulette wheel device, and related devices, systems, and methods, includes a base coupled to a table, the base having a circular ball track within a circular rim. The roulette wheel device further includes a circular wheelhead rotatably coupled to the base within the ball track. The wheelhead includes a circular ring having a plurality of pockets, wherein the circular ball track is sloped downwardly toward the circular ring to direct a roulette ball into one of the plurality of pockets. The wheelhead further includes a circular display subassembly including a display device to selectively display graphical elements corresponding to the plurality of pockets. The circular ball track, the circular ring, and the circular display subassembly are substantially concentric.

20 Claims, 6 Drawing Sheets

ROULETTE WHEEL DISPLAY DEVICE AND RELATED DEVICES, SYSTEMS, AND METHODS

CROSS-REFERENCE TO RELATED APPLICATIONS

This application is a Continuation of U.S. patent application Ser. No. 16/800,642, filed Feb. 25, 2020, the disclosure and content of which is incorporated by reference herein in its entirety.

BACKGROUND

Embodiments described herein relate to the field of gaming devices, such as in a casino environment, and in particular to a roulette wheel display device for a roulette table game. In casinos and other establishments, players may play table-based wagering games that employ mechanical features, such as a spinning roulette wheel. In some conventional roulette games, a wheelhead is rotatably attached to a table base, with a roulette ball being dropped into a ball track while the wheelhead is spinning, and coming to rest in one of a plurality of pockets arranged in a ring around the wheelhead.

In some conventional roulette games, the pockets have predetermined values, e.g., numbers 0-36, different colors, etc., that are associated with a plurality of different available bets. These values are not typically changeable, which may limit the features and functionality that can be offered at the roulette game.

SUMMARY

According to some embodiments, a roulette wheel device includes a base comprising a circular ball track within a circular rim. The roulette wheel device further includes a circular wheelhead rotatably coupled to the base within the circular ball track, the wheelhead including a circular ring comprising a plurality of pockets. The circular ball track is sloped downwardly toward the circular ring to direct a roulette ball into one of the plurality of pockets. a circular display subassembly comprising a display device to selectively display graphical elements corresponding to the plurality of pockets. The circular ball track, the circular ring, and the circular display subassembly are substantially concentric.

According to some embodiments, a method includes detecting rotation of a circular wheelhead of a roulette wheel device with respect to a base of the roulette wheel device for a roulette game, the circular wheelhead including a circular ring comprising a plurality of pockets, and the base comprising a circular ball track sloped downwardly toward the circular ring to direct a roulette ball into one of the plurality of pockets. The method further includes selectively displaying, by a circular display subassembly of the roulette wheel device based on detecting the rotation of the circular wheelhead, graphical elements corresponding to a plurality of pockets disposed around a circular ring of the wheelhead.

According to some embodiments, a roulette table includes a betting area including a plurality of betting positions, and a roulette wheel. The roulette wheel includes a base comprising a circular ball track within a circular rim. The roulette wheel further includes a circular wheelhead rotatably coupled to the base within the circular ball track, the wheelhead including a circular ring comprising a plurality of pockets. The circular ball track is sloped downwardly toward the circular ring to direct a roulette ball into one of the plurality of pockets. The roulette wheel further includes a circular display subassembly comprising a display device to selectively display graphical elements corresponding to the plurality of pockets. The circular ball track, the circular ring, and the circular display subassembly are substantially concentric.

DETAILED DESCRIPTION

Figure 1:
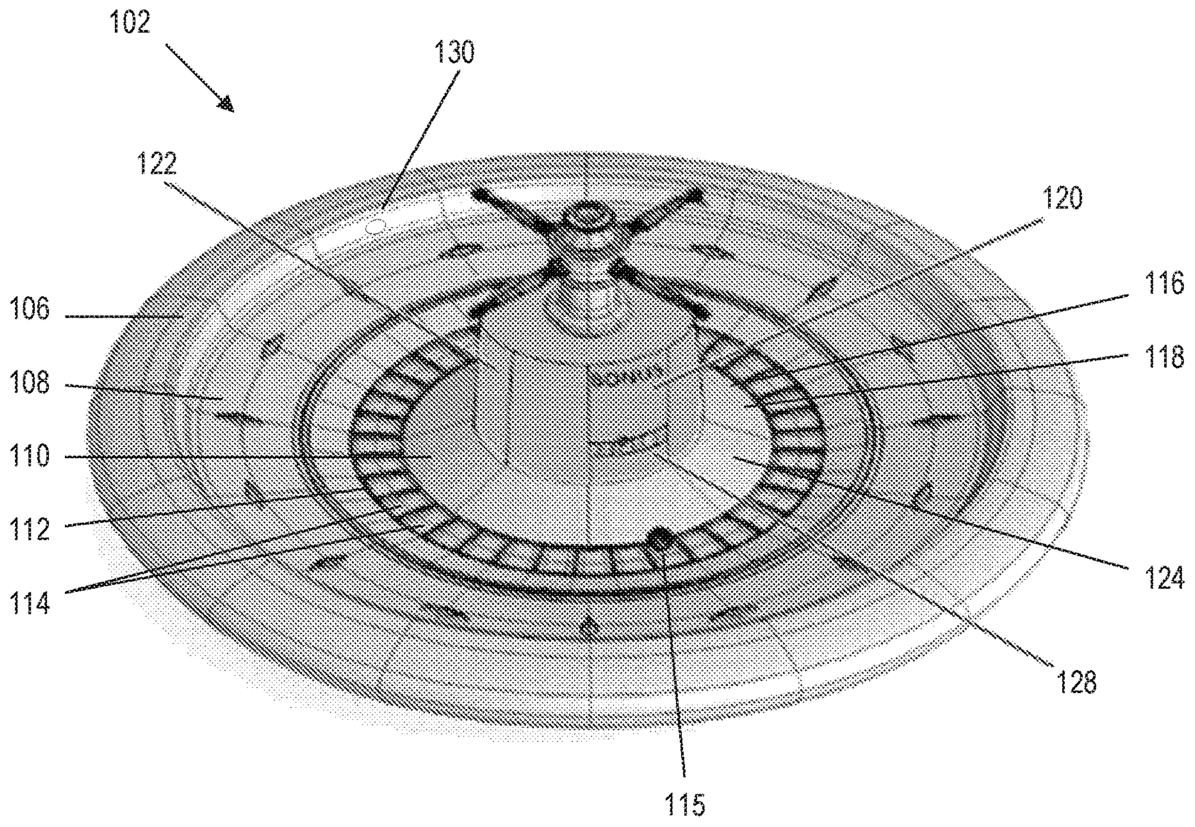
FIG. 1 is a perspective view of a roulette wheel device having a circular wheelhead with a circular display device, according to some embodiments.

According to some embodiments, a roulette wheel device includes a base coupled to a table, the base including a circular rim and a circular ball track within the circular rim. The roulette wheel device may further include a circular wheelhead rotatably coupled to the base within the ball track. The wheelhead may include a circular ring including a plurality of pockets, wherein the circular ball track is sloped downwardly toward the circular ring to direct a roulette ball into one of the plurality of pockets. The wheelhead may further include a circular display subassembly including a display device to selectively display graphical elements corresponding to the plurality of pockets. The circular rim, the circular ball track, the circular ring, and the circular display subassembly may be substantially concentric.

In some embodiments, video display devices may be incorporated into a roulette wheel and/or a table field. Roulette wheel display devices can include a single circular display device incorporated into the wheel and/or under the wheel, and can also include multiple wedge-shaped displays arranged in a ring within and/or under the wheel. Additional features may include providing additional wagering opportunities and/or games, e.g., bonus games or progressive games, into the roulette game. These additional wagering opportunities may be based on determining pockets that the roulette ball bounced into before coming to rest in a particular pocket, providing an additional or alternative award based on an independently moving graphical elements on the display, or a combination of graphical elements and the physical location of the ball, for example. In one example, the display device may display a separately spinning progressive wheel, with a progressive award being awarded if the progressive result is the same as the winning result of the traditional roulette game. The progressive wheel may spin in a different direction, at a different speed, and/or randomly with respect to the spinning of the physical wheel.

In some examples, a roulette wheel display device may allow custom roulette games, custom themed games, bonuses, and side bet capabilities. In some examples, the display may include light-emitting diodes (LEDs), organic LEDs (OLEDs), e-ink, or other components that may be selectively activated and/or illuminated at different colors and/or brightness. These and other features may be game-related ad/or non-game related (e.g., aesthetic), as desired.

In some examples, the roulette wheel may include one or more cameras to capture aspects of the physical spin (e.g., the movement of the wheel and ball) in real time. Graphical elements may be customized during the spin based on the captured images. For example, if a player bet on a number associated with a player's jersey in a football themed game, landing on that number could cause the display device to display an animation of the player running for a touchdown. In some examples, the display device may be transparent or semi-transparent when not in use. The display devices may also be customized based on expected viewing angles for players of the roulette game.

In some examples, the display may synchronize displayed numbers, symbols, graphics (e.g., emoji), and/or positions to the physical pockets of the wheel, and may be changed and/or randomized over time to add additional randomness to the roulette spin.

In some examples, the betting field may include a display device. For example, the betting field display device may display a sports field graphic with betting opportunities and/or bonus game triggers corresponding to players, jersey numbers, field position, player actions, etc. For example, in a football themed game, a bonus spinner displayed by the wheel could determine a first-down position for the next play on a real or simulated game being displayed on the table, with a multiplier or other bonus being awarded if the actual game result matches the bonus spinner value. In another example, players could wager on game events, such as when a next down will run and/or number of yards on the next play.

In some examples, the roulette wheel could select lottery numbers, as part of the main game and/or bonus game. For example, a player may purchase a lottery ticket at the table, with the numbers being valid for one or more spins, for a predetermined amount of time, and/or for an amount of time the player is playing at the roulette table.

In some examples, the roulette wheel display may display a monetary and/or non-monetary award. The roulette wheel display may also be dynamically themed, e.g., for a particular holiday or sporting event, or may accept user input. For example, a player could link his phone to the table and upload a family photo, which could be displayed on the table display device in the event of a win by that player. In this manner, these and other embodiments provide a unique technical solution to the technical problem of providing additional features at a roulette game, such as a physical roulette table game.

Referring now to FIG. 1, a perspective view of a roulette wheel device 102 is illustrated, according to some embodiments. In this embodiment, the roulette wheel device 102 includes a base coupled to a table, with the base including a circular rim 106 a circular ball track 108 within the circular rim 106. In this example, the ball track 108 includes a plurality of raised diamond-shaped protrusions, which cause the ball 115 to bounce within the roulette wheel, thereby increasing randomness. The roulette wheel device 102 further includes a circular wheelhead 110 rotatably coupled to the base within a ball track 108, with the circular wheelhead 110 including a circular ring 112 including a plurality of pockets 114.

The roulette wheel device 102 further includes a circular display subassembly 116 including a display device 118 to selectively display graphical elements 120 corresponding to the plurality of pockets 114. The circular rim 106, the circular ball track 108, the circular ring 112, and the circular display subassembly 116 are substantially concentric.

The roulette wheel device 102 further includes a plurality of image capture devices 128, 130 to capture images of the roulette ball 115 and the plurality of pockets 114. In this example, some or all of the image capture devices 128 may be coupled to the circular wheelhead 110 facing radially outwardly toward the circular ring 112, and/or some or all of the image capture devices 130 may be coupled to the base facing radially inwardly toward the circular ring 112, as desired.

Figure 2:
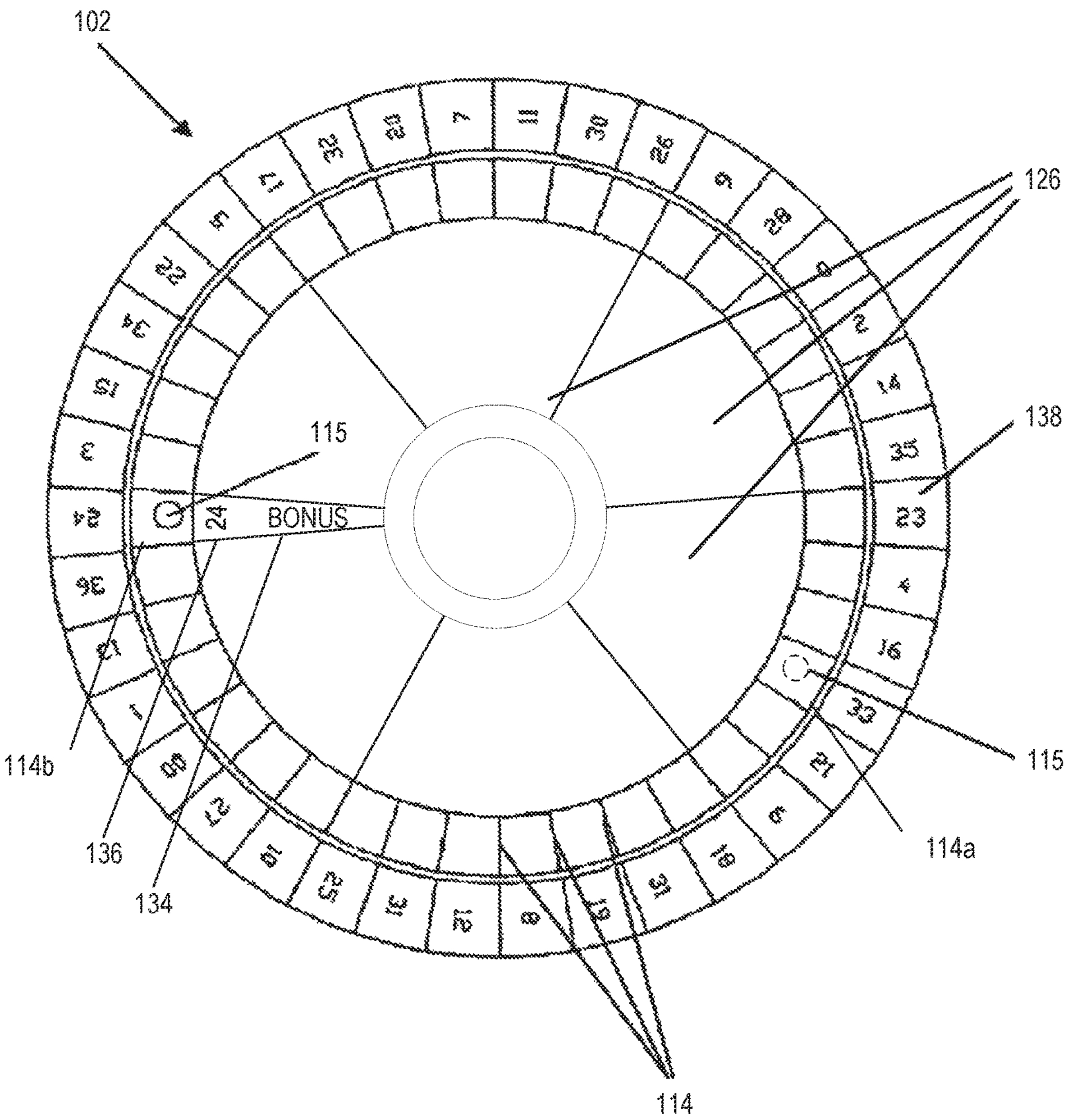
FIG. 2 is a top view of the roulette wheel device of FIG. 1 illustrating details of the arrangement of display device components, according to some embodiments.

Referring now to FIG. 2, a top view of the roulette wheel device 102 of FIG. 1 illustrates details of the arrangement of the components thereof, according to some embodiments. In this example, the display device 118 includes a plurality of arcuate display devices 126 arranged in a circular array on the wheelhead 110 in this example. Each arcuate display device 126 is associated with a subset of the plurality of pockets 114. Alternatively, the display device 118 may include a single circular display device, as desired.

In some examples, the display device may display a separately spinning progressive wheel 134, with a plurality of progressive symbols 136. In some embodiments, if the certain progressive symbols 136 correspond to certain game symbols 138 of the primary game. In some embodiments, a game result may be based on the ball 115 bouncing in a particular pocket 114*a* before coming to rest in a different particular pocket 114*b*

Figure 3:
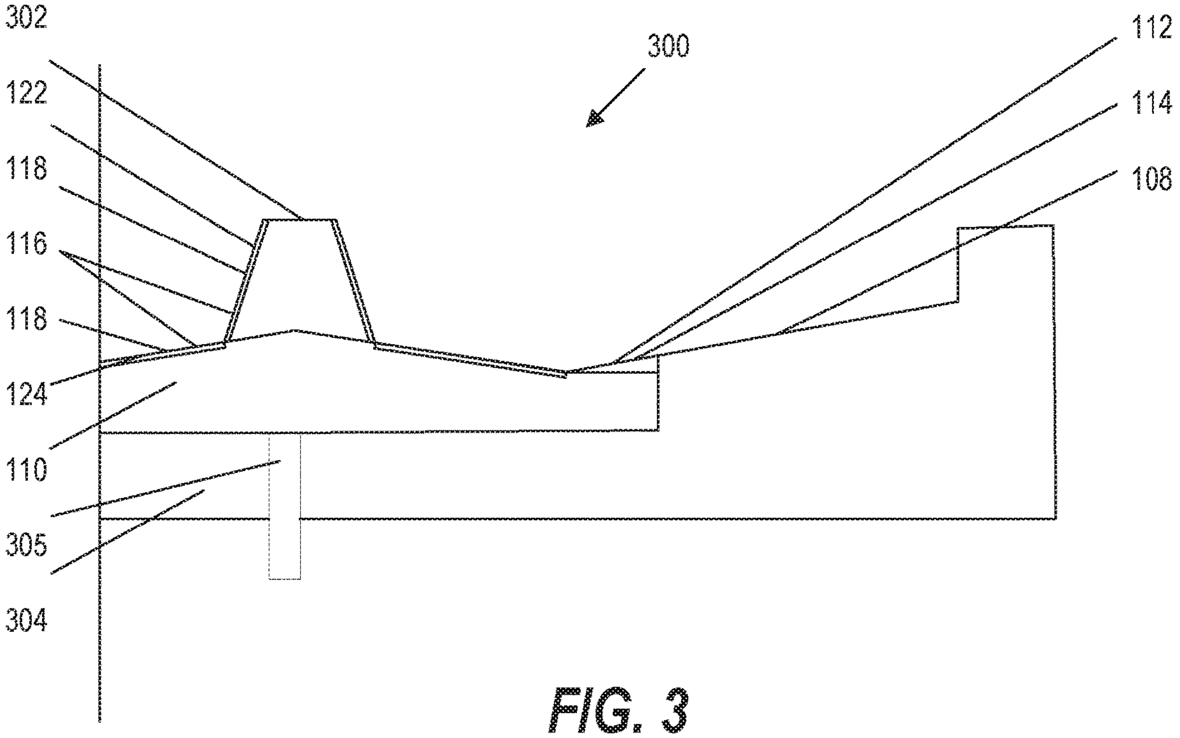
FIG. 3 is a partial cross-sectional side view of the roulette wheel device of FIGS. 1 and 2 showing the display device disposed in the wheelhead of the roulette wheel, according to some embodiments.

FIG. 3 is a partial cross-sectional side view of a roulette table 300 having a base 304 with the roulette wheel device 102 of FIGS. 1 and 2 mounted therein, showing the display device 118 disposed in the wheelhead 110 of the roulette wheel device 102, according to some embodiments. In this example, the wheelhead 110 is supported on a spindle 305 (e.g., by a bearing) that allows the wheelhead 110 to freely rotate with respect to the base 304.

In this example, the circular ball track 108 is sloped downwardly toward the circular ring 112 to direct a roulette ball into one of the plurality of pockets 114. The circular display subassembly 116 is incorporated into the wheelhead 110 and rotates with the wheelhead 110. In this example, the circular display subassembly 116 is also sloped downwardly toward the circular ring 112 to direct the roulette ball into one of the plurality of pockets 114. In some embodiments, the circular display subassembly 116 can be electronically connected to electronic components within the base 304, for example via a split ring subassembly, and/or wirelessly, as desired.

In this example, the circular display subassembly 116 includes an inner portion 122, e.g., a turret portion, and an intermediate portion 124, e.g., a cone portion, disposed between the inner portion 122 and the plurality of pockets 114. The inner portion 122 of the circular display subassembly 116 is sloped downwardly at an angle that is greater than 45 degrees, and the intermediate portion 124 of the circular display subassembly 116 is sloped downwardly at an angle that is greater than 0 degrees and that is less than 30 degrees in this embodiment. It should also be understood that these and other aspects of the geometry of the roulette wheel device 102 may be modified as desired, e.g. for aesthetic and/or functional reasons.

Figure 4:
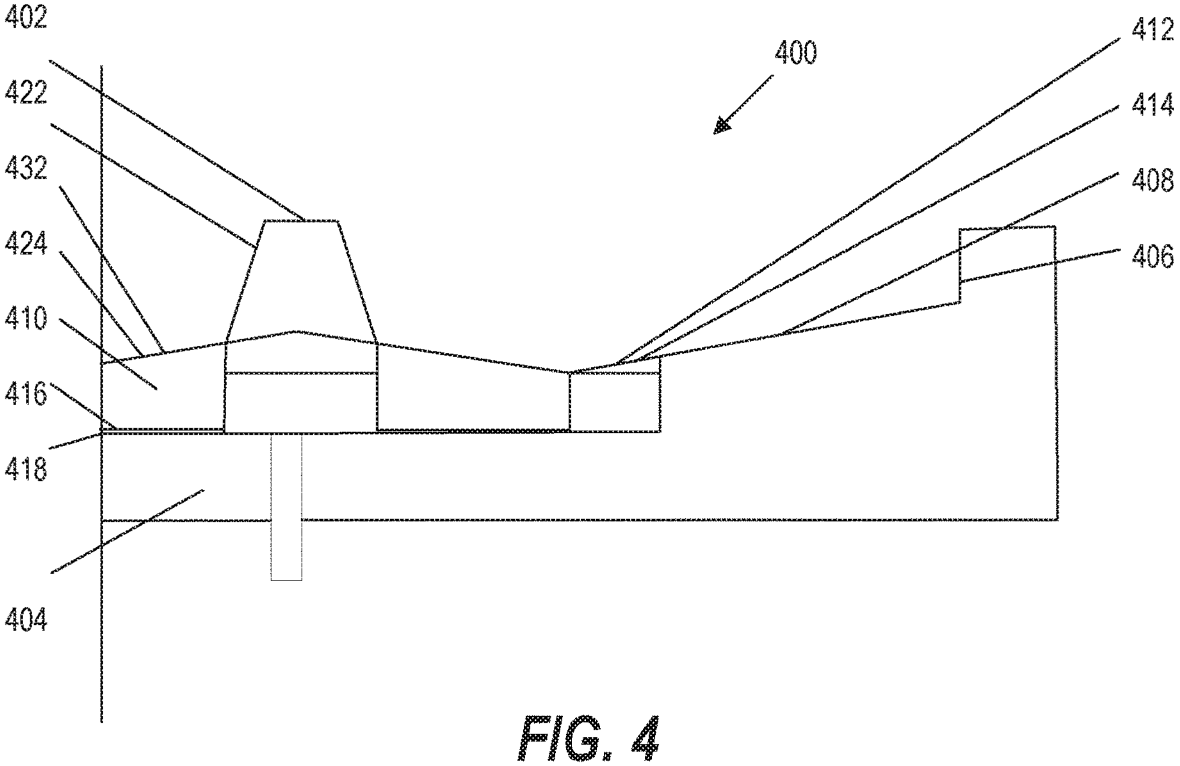
FIG. 4 is a partial cross-sectional side view of an alternative roulette wheel device showing a display device disposed below the wheelhead of the roulette wheel, according to some embodiments.

Referring now to FIG. 4, a partial cross-sectional side view of an alternative roulette wheel device 402 illustrates a display device 418 disposed below the wheelhead 410 of the roulette wheel device 402, according to some embodiments. In this example, the roulette wheel device 402 includes a base 404 coupled to a table 400, including a circular rim 406, a circular display device subassembly 416, and a circular ball track 408 disposed between the circular rim 406 and the circular display device subassembly 416. The roulette wheel device 402 further includes a circular wheelhead 410 rotatably coupled to the base 404 over the circular display device subassembly 416 within the ball track 408, including a circular ring 412 including a plurality of pockets 414 and a circular display window 432, wherein a portion of the circular display device 418 of the circular display device subassembly 416 is visible to a user of the roulette wheel device 402 through the circular display window 432.

In this example, the circular ball track 408 is sloped downwardly toward the circular ring 412 to direct a roulette ball into one of the plurality of pockets 414, and the circular display window 432 is also sloped downwardly toward the circular ring 412 to direct the roulette ball into one of the plurality of pockets 414. As with the embodiment of FIGS. 1-3 above, the inner portion 422 of the wheelhead 410 is sloped downwardly at an angle that is greater than 45 degrees, and the intermediate portion 424 (e.g., the display window 432) of the wheelhead 410 is sloped downwardly at an angle that is greater than 0 degrees and that is less than 30 degrees in this embodiment.

Figure 5:
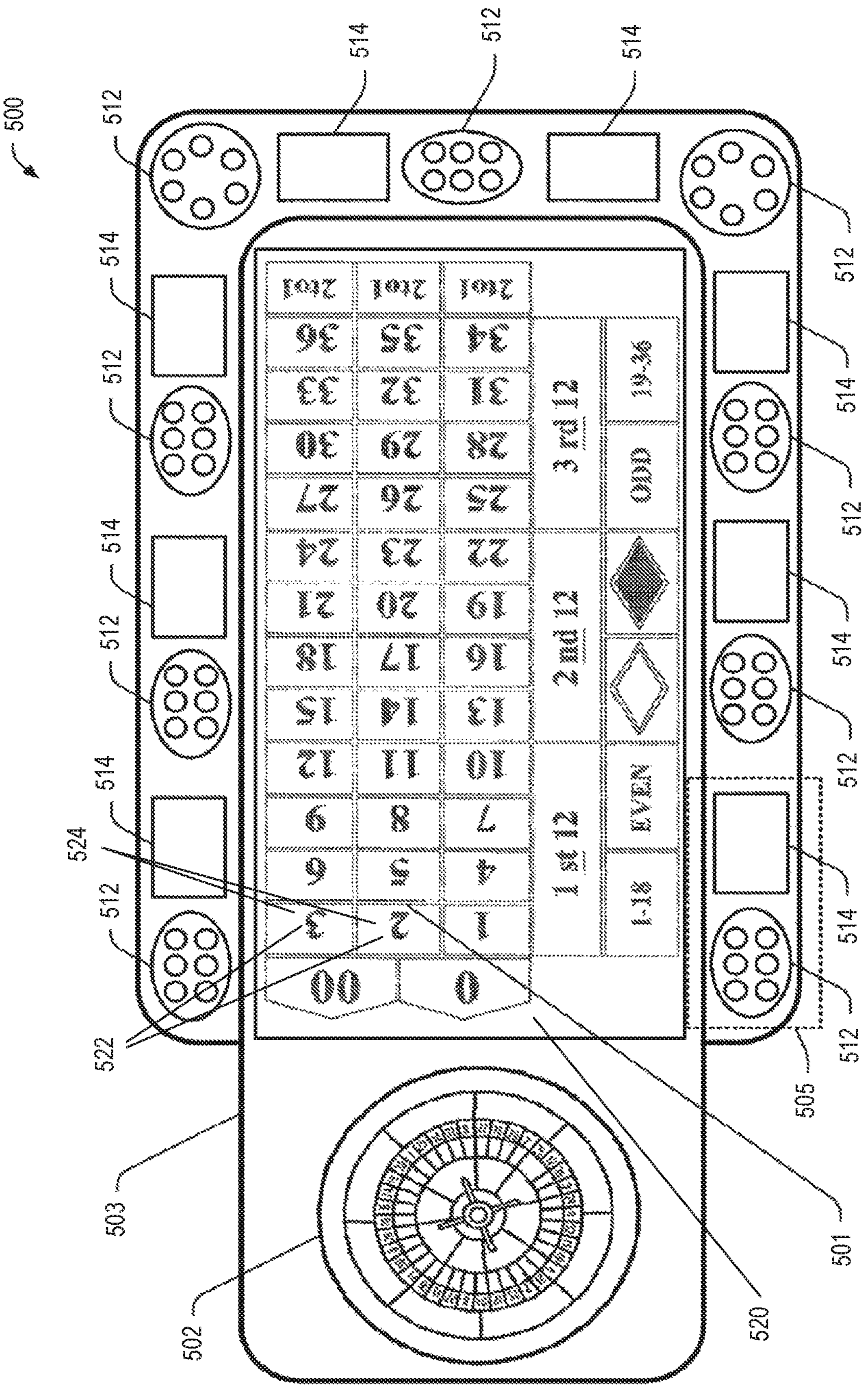
FIG. 5 is a top view of a roulette table having a display device for displaying and receiving available bets for the roulette game, according to some embodiments.

FIG. 5 is a top view of a gaming table system 500 (e.g., a roulette table) having a display device 520 for displaying and receiving available bets for the roulette game, according to some embodiments. As illustrated in the example of FIG. 5, gaming table system 500 may include one or more of the following components and/or features (and/or combinations thereof), described below.

Components of the gaming table system 500 may include one or more game play activity regions (e.g., 501) where, for example, game play activities may occur, game play data may be generated, and/or game outcome data may be displayed. Components of the gaming table system 500 may include a roulette wheel device 502 having components similar to the roulette wheel device 102 of FIGS. 1-4 and other roulette wheel devices described herein. The gaming table system 500 may include one more shared or common player betting areas (e.g., betting area 501) which, for example, may be concurrently accessed or used by one or more players at the gaming table for placing wagers and/or for performing various wager-related activities. In this example, the player betting area 501 may be displayed on a betting area display device 520 such as, for example, a multi-player, multi-touch display device, that selectively displays graphical elements 522 associated with a plurality of bet positions 524 of the betting area 501.

Components of the gaming table system 500 may further include one or more electronic player displays 514. In some embodiments, one or more player displays 514 may each be associated with a respective player station 505 and/or player at the gaming table. In some embodiments, one or more of the player displays 514 may be operable to display various types of information such as, for example: game play information, wagering information, player tracking information, bonus game information, etc. For example, in one embodiment, a player display 514 a may be linked to (or associated with) a first player (e.g., Player A) at the gaming table, and may be operable to display various types of information, including, for example, information relating to wagers which have been placed (and/or which are to be placed) by Player A. Components of the gaming table system may further include one or more user input selection regions 512 which have been configured or designed for use with one or more user input devices.

In some embodiments, gaming table system 500 may include a plurality of different player stations 505. In one embodiment, each player station 505 may be associated with a respective player at the gaming table. For example, in some embodiments, each (or selected) player station(s) 505 at the gaming table system 500 may include at least one respective player display 514.

In some embodiments, gaming table system 500 may be configured or designed to allow multiple different players at the gaming table to simultaneously or concurrently interact with common betting area 501 to thereby allow each player to place one or more wagers (e.g., via that player's interaction with common betting area 501) contemporaneously with the wagering activities performed by the other players at the gaming table. In some embodiments, the common betting area 501 may be configured or designed to display static machine readable wager-related information (such as, for example, wager-related symbols and/or characters) via the use of non-electronic display mechanism(s) such as, for example, markings which have been printed on to a surface material used to cover at least a portion of the gaming table surface.

In some embodiments, one or more of the user input selection regions 512 may be configured or designed to display static wager denomination values (e.g., $1, $2, $5, $10, etc.). In at least one embodiment, the displayed wager denomination information may include a first a portion of human-readable content including, for example, alpha-numeric characters, patterns, colors, and/or symbols which maybe observed and recognized by a human such as, for example, a player at the gaming table. Additionally, in some embodiments, the displayed wager denomination information may include a second portion of machine-readable content which, for example, maybe detected and/or read by an image capture device associated with the game and/or the player.

In some embodiments, the image capture device(s) may be operable to read various types of information from one or more user input selection regions at the gaming table. For example, in one embodiment, one or more of the user-input selection regions may be configured or designed to display wager-input selection information (e.g., such as, for example, various different wager denomination values, etc.) which, for example, may be read by an image capture device, and/or which may be used to facilitate selection, input, review, and/or modification of the player's wagers and/or wagering instructions. In some embodiments, at least a portion of the user input selection regions may be configured or designed to display (or provide access to) machine readable data which maybe read, detected, and/or otherwise interpreted by one or more user input devices.

Figure 6:
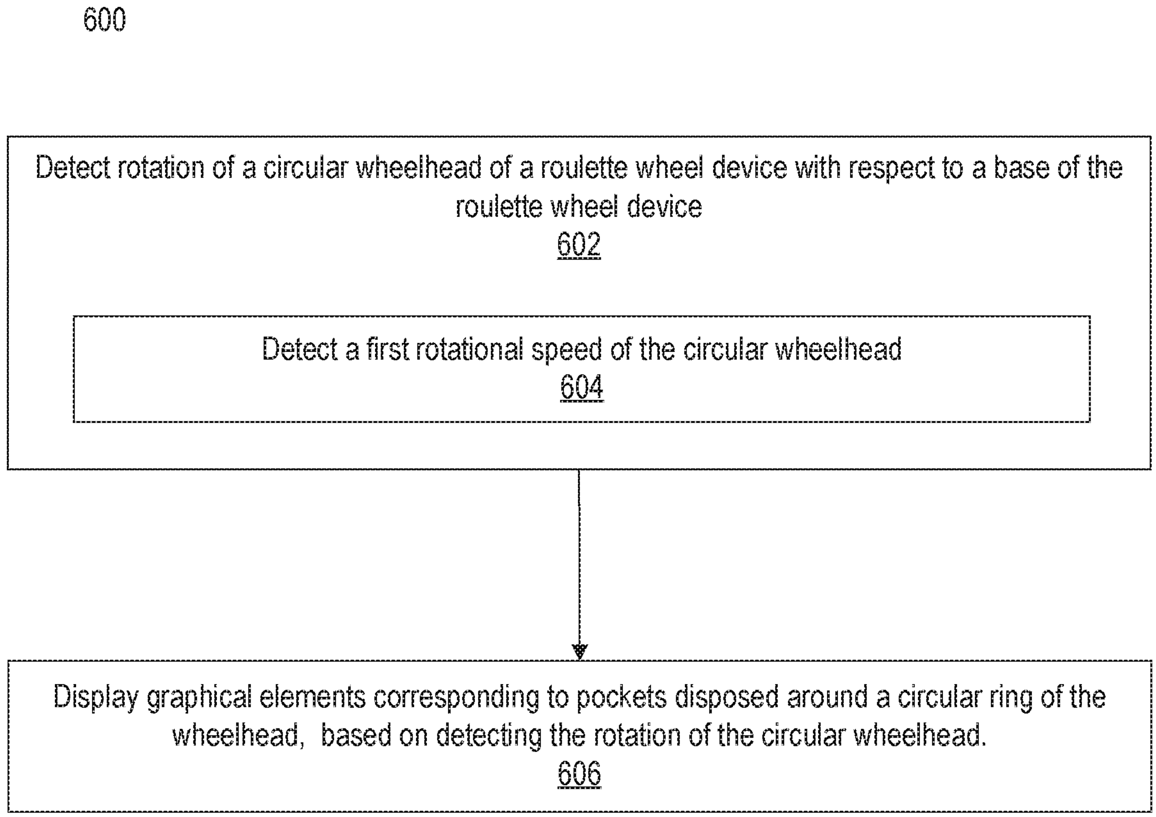
FIG. 6 is a block diagram illustrating operations for displaying graphical elements on a roulette wheel display, according to some embodiments.

FIG. 6 is a block diagram illustrating operations for displaying graphical elements on a roulette wheel display, according to some embodiments. The operations 600 may include detecting rotation of a circular wheelhead of a roulette wheel device with respect to a base of the roulette wheel device (Block 602). In some embodiments, detecting the rotation of the circular wheelhead may further include detecting a first rotational speed of the circular wheelhead (Block 604), with the plurality of pockets corresponds to a first sequence of ball position values, and with the graphical elements including an animation of a second sequence of ball position values rotating at a second rotational speed different from the first rotational speed.

The operations 600 may further include displaying, by a circular display subassembly of the circular wheelhead based on detecting the rotation of the circular wheelhead, graphical elements corresponding to a plurality of pockets disposed around a circular ring of the wheelhead (Block 606). For example, the rotation of the graphical progressive wheel 134 of FIG. 2 may be based at least in part on the detected rotation of the physical wheelhead. In some embodiments, the progressive wheel may be graphically rotated in a direction opposite the detected rotation of the wheelhead, and/or at a different rotational speed. In some embodiments, the progressive wheel may come to a stop at the same or different time as the physical wheelhead.

Figure 7:
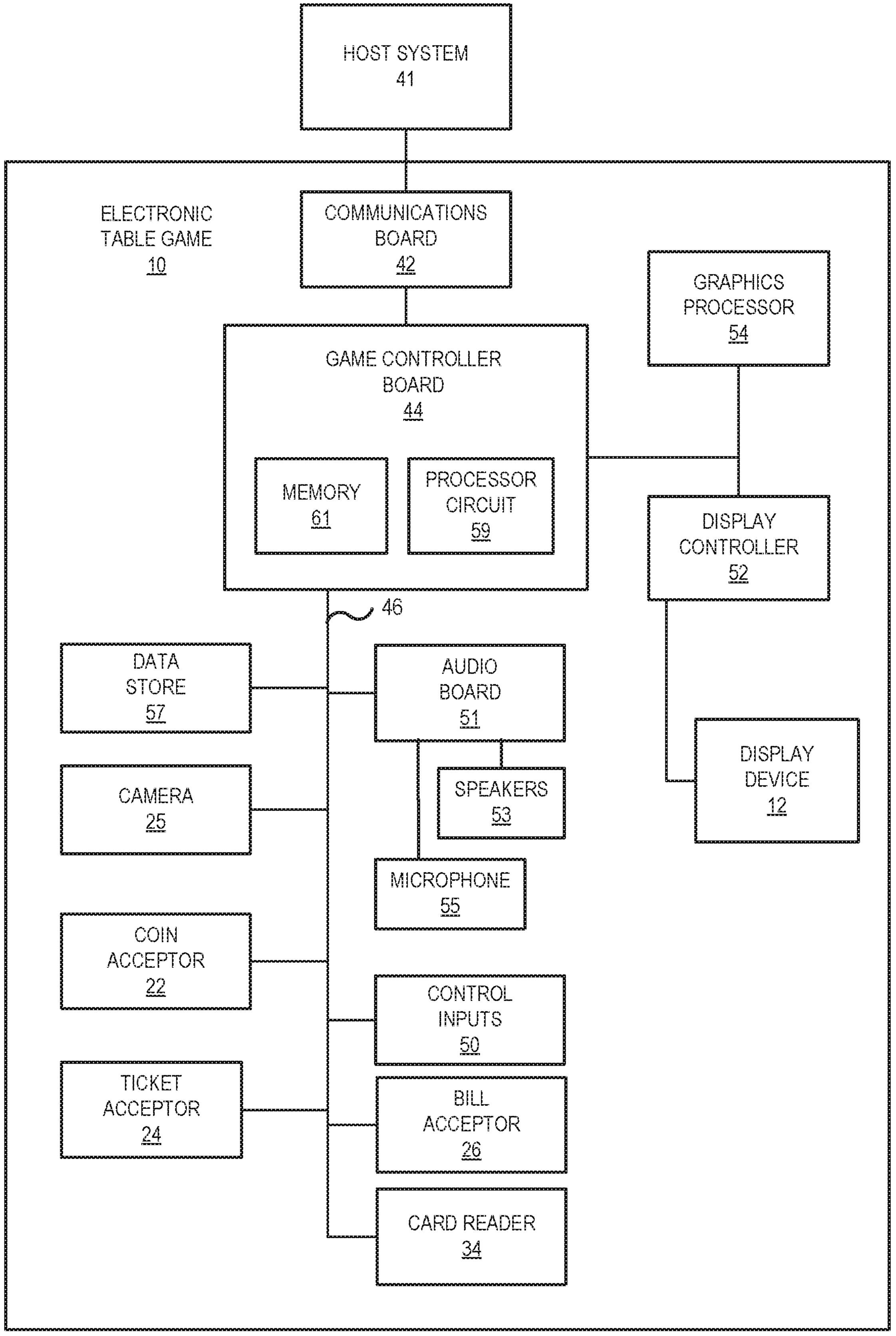
FIG. 7 is a block diagram of some components of a roulette game device having a roulette wheel display device, according to some embodiments.

FIG. 7 is a block diagram of some components of a roulette game device having a roulette wheel display device, according to some embodiments. The roulette gaming device 10 is shown linked to the casino's host system 41 via network infrastructure. These hardware components are particularly configured to provide at least one interactive game. These hardware components may be configured to provide at least one interactive game and at least one bonus game, and in some cases to provide a plurality of concurrently displayed interactive games.

A communications board 42 may contain circuitry for coupling the gaming device 10 to network. The communications board 42 may include a network interface allowing gaming device 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless, fixed line, local area network, wide area network, and others, including any combination of these. The gaming device 10 may communicate over a network using a suitable protocol, such as the G2S protocols.

The communications board 42 may communicate, transmit and receive data using a wireless transmitter, or it may be wired to a network, such as a local area network running throughout the casino floor, for example. The communications board 42 may set up a communication link with a master controller and may buffer data between the network and a game controller 44. The communications board 42 may also communicate with a network server, such as in accordance with the G2S standard, for exchanging information to carry out embodiments described herein.

The game controller 44 includes a memory 61 and a processor circuit 59 for carrying out program instructions stored in the memory and for providing the information requested by the network. Game data for one or more game programs may be stored in the memory 61. The processor circuit 59 may be a multi-core processor including two or more independent processing units. Each of the cores in the processor circuit 59 may support multi-threading operations, i.e., may have the capability to execute multiple processes or threads concurrently. Additionally, the processor circuit 59 may have an on-board memory cache. An example of a suitable multi-core, multithreaded processor circuit is an Intel® Core i7-7920HQ processor, which has four cores that support eight threads each and has an 8 MB on-board cache. The game controller 44 executes game routines using game data stores in a data store 57 accessible to the game controller 44, and cooperates with a graphics processor 54 and a display controller 52 to provide games with enhanced interactive game components. The graphics processor 54 may have an integrated high-speed dedicated graphics memory.

The gaming device 10 may include at least one data capture camera device 25 for implementing the gaming enhancements, in accordance with some embodiments. The gaming device 10 may include the data capture camera device 25, one or more sensors (e.g. optical sensor), or other hardware device configured to capture and collect in real-time or near real-time data relating to the eye gaze, eye gesture, or movement of the player(s), or any combination thereof.

In some embodiments, the data capture camera device 25 may be used for eye gaze tracking, eye gesture tracking, motion tracking, and movement recognition. The data capture camera device 25 may collect data defining x, y and z coordinates representing eye gaze, eye gestures, and movement of the player(s).

In some embodiments, the data capture camera device 25 may track a position of each eye of a player relative to display device 12, as well as a direction of focus of the eyes and a point of focus on the display device 12, in real-time or near real-time. The focus direction may be the direction at which the player's line of sight travels or extends from his or her eyes to display device 12. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

In some embodiments, the data capture camera device 25 may monitor the eye gaze, eye gesture, and/or movement of two or more people, who may be two or more players of the interactive game, to collect the player eye gaze data, player eye gesture data, and/or player movement data. The player eye gaze data, player eye gesture data, and/or player movement data may be used such that both players may be able to play the interactive game simultaneously. The interactive game may include aspects of both cooperative and competitive play.

As previously described, the data capture camera device 25 may track a position of a player's eyes relative to display device 12, as well as a focus direction and a focus point on the display device 12 of the player's eyes in real-time or near real-time. The focus direction can be the direction at which the player's line of sight travels or extends from his or her eyes to the display device 12. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be instances of player movement data.

In addition, a focus point may extend to or encompass different visual fields visible to the player. For example, a foveal area may be a small area surrounding a fixation point on the display device 12 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

The display controller 52 may control one or more of display device 12 the using graphics processor 54 to display a viewing area that may include one or more visible game components based on the game data of a plurality of concurrently displayed interactive games.

The display controller 52 may, in response to detection of the control command from the game controller 44 based on the player eye gaze data, player eye gesture data, or player movement data, control display device 12 using graphics processor 54. Display controller 52 may update the viewing area to trigger a graphical animation effect displayed on one or both of display device 12 representative of a visual update to the visible game components in the viewing area, the visual update based on the player eye gaze data, player eye gesture data, or player movement data.

Peripheral devices/boards in the gaming device 10 may communicate with the game controller 44 via a bus 46 using, for example, an RS-232 interface. Such peripherals may include a bill acceptor 26, a coin acceptor 22, a smart card reader or other type of credit card reader 34, and player control inputs 50 (such as buttons or a touch screen).

The player control inputs 50 may include the keypad, the buttons, touchscreen display, gesture tracking hardware, and data capture device as described herein. Other peripherals may be one or more cameras used for collecting player input data, or other player movement or gesture data that may be used to trigger player interaction commands. The display device 12 may be a touch sensitive display device. Player control input 50 may be integrated with the display device 12 to detect player interaction input at the display device 12.

The game controller 44 may also control one or more devices that produce the game output including audio and video output associated with a particular game that is presented to the user. For example, an audio board 51 may convert coded signals into analog signals for driving speakers 53. Some embodiments provide that an audio board may convert audio signals, either analog or digital, that are received via a microphone 55, into coded signals.

The game controller 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in gaming device 10, or may reside at the host system 41. In some embodiments, the electronic data store storing game data may reside in the cloud.

The card reader 34 reads cards for player and credit information for cashless gaming. The card reader 34 may read a magnetic code on a conventional player tracking card, where the code uniquely identifies the player to a host system at the venue. The code is cross-referenced by the host system 41 to any data related to the player, and such data may affect the games offered to the player by the gaming terminal. The card reader 34 may also include an optical reader and printer for reading and printing coded barcodes and other information on a paper ticket. A card may also include credentials that enable the host system 41 to access one or more accounts associated with a user. The account may be debited based on wagers by a user and credited based on a win.

The graphics processor 54 may be configured to generate and render animation game enhancements based on game data as directed by the game controller 44. The game enhancements may involve an interactive game environment that may provide one or more game components and graphical animation effects. The graphics processor 54 may be a specialized electronic circuit designed for image processing (including 2D and 3D image processing in some examples) in order to manipulate and transform data stored in memory to accelerate the creation of images in a frame buffer for output to the display by way of the display controller 52. The graphics processor 54 may redraw various game enhancements as they dynamically update. The graphics processor 54 may cooperate with game controller 44 and display controller 52 to generate and render enhancements as described herein. The graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

The display controller 52 may employ a high data transfer rate and may convert coded signals to pixel signals for the display. The display controller 52 and the audio board 51 may be directly connected to parallel ports on the game controller 44. The electronics on the various boards may be combined onto a single board. The display controller 52 may control output to one or more display device 12 (e.g. an electronic touch sensitive display device). The display controller 52 may cooperate with graphics processor 54 to render animation enhancements on the display device 12.

The display controller 52 may be configured to interact with graphics processor 54 to control the display device 12 to display a viewing area defining the interactive game environment including navigation to different views of the interactive game environment. Player control inputs 50 and the data capture camera device 25 may continuously detect player interaction commands to interact with interactive game environment. For example, the player may move a game component to a particular position, select a game component, or manipulate the display of the game components.

In some embodiments, the display controller 52 may control the display device 12 using the graphics processor 54 to display the viewing area that may have one or more game components. In response to the detection of the control command based on the player eye gaze data, player eye gesture data, player movement data, or any combination thereof, the display controller 52 may trigger a graphical animation effect to represent a visual update to the game components in the viewing area.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The foregoing discussion provides many example embodiments. Although each embodiment represents a single combination of elements, other examples may include all possible combinations of the disclosed elements. Thus, if one embodiment includes elements A, B, and C, and a second embodiment includes elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, video display terminal, gaming console, electronic reading device, and wireless hypermedia device or any other computing device capable of being configured to carry out the methods described herein.

The terminology used herein is for the purpose of describing particular aspects only and is not intended to be limiting of the disclosure. As used herein, the singular forms "a", "an" and "the" are intended to include the plural forms (e.g., "one or more") as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof. As used herein, the term "and/or" includes any and all combinations of one or more of the associated listed items and may be designated as "/". Like reference numbers signify like elements throughout the description of the figures.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A roulette wheel device comprising:

a base comprising a circular ball track within a circular rim; and a circular wheelhead rotatably coupled to the base within the circular ball track, the wheelhead comprising a circular ring comprising a plurality of pockets, wherein the circular ball track is sloped downwardly toward the circular ring to direct a roulette ball into one of the plurality of pockets; and a circular display subassembly comprising a display device to selectively display graphical elements corresponding to the plurality of pockets, wherein the circular ball track, the circular ring, and the circular display subassembly are substantially concentric.

2. The roulette wheel device of claim 1, wherein the circular display subassembly is coupled to the circular wheelhead such that the circular display subassembly and the circular wheelhead are rotatable with respect to the base.

3. The roulette wheel device of claim 1, wherein the circular display subassembly is coupled to the base such that the circular wheelhead is rotatable with respect to the base,
- wherein the circular wheelhead further comprises a circular display window,
- wherein a portion of the circular display subassembly is visible to a user of the roulette wheel device through the circular display window, and
- wherein the circular display is concentric with the circular ring and the circular display subassembly.

4. The roulette wheel device of claim 1, wherein the circular display subassembly is sloped downwardly toward the circular ring to direct the roulette ball into one of the plurality of pockets.

5. The roulette wheel device of claim 1, wherein the circular display subassembly comprises an inner portion and an intermediate portion disposed between the inner portion and the plurality of pockets,
- wherein the inner portion of the circular display subassembly is sloped downwardly at an angle that is greater than 45 degrees.

6. The roulette wheel device of claim 5, wherein the intermediate portion of the circular display subassembly is sloped downwardly at an angle that is greater than 0 degrees and that is less than 30 degrees.

7. The roulette wheel device of claim 5, wherein the inner portion comprises a turret portion, the display device comprising a turret display device arranged on the turret portion.

8. The roulette wheel device of claim 1, wherein the display device comprises a plurality of arcuate display devices arranged in a circular array on the wheelhead, wherein each arcuate display device is associated with a subset of the plurality of pockets.

9. The roulette wheel device of claim 1, further comprising an image capture device to capture images of the roulette ball and the plurality of pockets.

10. The roulette wheel device of claim 9, wherein the image capture device is coupled to the circular wheelhead facing radially outwardly toward the circular ring.

11. The roulette wheel device of claim 9, wherein the image capture device is coupled to the base facing radially inwardly toward the circular ring.

12. A method comprising:
- detecting rotation of a circular wheelhead of a roulette wheel device with respect to a base of the roulette wheel device for a roulette game, the circular wheelhead comprising a circular ring comprising a plurality of pockets, and the base comprising a circular ball track sloped downwardly toward the circular ring to direct a roulette ball into one of the plurality of pockets; and
- selectively displaying, by a circular display subassembly of the roulette wheel device based on detecting the rotation of the circular wheelhead, graphical elements corresponding to a plurality of pockets disposed around a circular ring of the wheelhead.

13. The method of claim 12, further comprising capturing a plurality of images of the roulette ball and the plurality of pockets by an image capture device.

14. The method of claim 13, wherein the image capture device is coupled to the circular wheelhead facing radially outwardly toward the circular ring.

15. The method of claim 13, wherein the image capture device is coupled to the base facing radially inwardly toward the circular ring.

16. The method of claim 12, further comprising:
- determining that the roulette ball has bounced in a first pocket of the plurality of pockets before coming to rest in a second pocket of the plurality of pockets;
- determining a primary game result based on the roulette ball coming to rest in the second pocket; and
- determining a secondary game result based on the roulette ball bouncing in the first pocket.

17. The method of claim 12, wherein detecting the rotation of the circular wheelhead further comprises detecting a first rotational speed of the circular wheelhead,
- wherein the plurality of pockets corresponds to a first sequence of ball position values, and
- wherein the graphical elements comprise an animation of a second sequence of ball position values rotating at a second rotational speed different from the first rotational speed.

18. A roulette table comprising:
- a betting area comprising a plurality of betting positions; and
- a roulette wheel comprising:
  - a base comprising a circular ball track within a circular rim; and
  - a circular wheelhead rotatably coupled to the base within the circular ball track, the wheelhead comprising a circular ring comprising a plurality of pockets, wherein the circular ball track is sloped downwardly toward the circular ring to direct a roulette ball into one of the plurality of pockets; and
  - a circular display subassembly comprising a display device to selectively display graphical elements corresponding to the plurality of pockets,
  - wherein the circular ball track, the circular ring, and the circular display subassembly are substantially concentric.

19. The roulette table of claim 18, wherein the betting area comprises a betting area display device to selectively display graphical elements associated with the plurality of bet positions.

20. The roulette table of claim 18, further comprising a plurality of player stations, each player station comprising a player display device to display information associated with a player at the player station.

* * * * *